United States Patent
Guo et al.

(10) Patent No.: US 11,297,328 B2
(45) Date of Patent: *Apr. 5, 2022

(54) VIDEO CODING METHOD, DEVICE, DEVICE AND STORAGE MEDIUM

(71) Applicant: TENCENT TECHNOLOGY (SHENZHEN) COMPANY LIMITED, Guangdong (CN)

(72) Inventors: Yao Yao Guo, Shenzhen (CN); Xu Nan Mao, Shenzhen (CN); Chen Chen Gu, Shenzhen (CN); Xin Wei Gao, Shenzhen (CN); Tao Zhang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,207

(22) Filed: Nov. 20, 2020

(65) Prior Publication Data
US 2021/0076044 A1    Mar. 11, 2021

Related U.S. Application Data

(63) Continuation of application No. 16/401,671, filed on May 2, 2019, now Pat. No. 10,893,275, which is a
(Continued)

(30) Foreign Application Priority Data

Jun. 15, 2017    (CN) .......................... 201710461367.7

(51) Int. Cl.
*H04N 19/107*    (2014.01)
*H04N 19/114*    (2014.01)
(Continued)

(52) U.S. Cl.
CPC ............. *H04N 19/139* (2014.11); *H04N 7/14* (2013.01); *H04N 19/107* (2014.11);
(Continued)

(58) Field of Classification Search
None
See application file for complete search history.

(56) References Cited

U.S. PATENT DOCUMENTS 6,025,888 A    2/2000 Pauls
8,938,005 B2 *  1/2015 Oishi .................... H04N 19/15
375/240.16
(Continued)

FOREIGN PATENT DOCUMENTS

CN    101742293 A    6/2010
CN    102572381 A    7/2012
(Continued)

OTHER PUBLICATIONS

Written Opinion of the International Searching Authority for PCT/CN2018/087539 dated Aug. 8, 2018.
(Continued)

*Primary Examiner* — Patricia I Young
(74) *Attorney, Agent, or Firm* — Sughrue Mion, PLLC

(57) ABSTRACT

A method that is performed by a video encoding device is provided. The method includes identifying N image frames in a sliding window of an image frame sequence, the N image frames including N−1 encoded image frames and a to-be-encoded image frame; obtaining a motion amplitude difference of the N image frames in the sliding window, the motion amplitude difference indicating a difference between a corresponding image frame motion amplitude and a previous image frame motion amplitude; updating a static variable based on the motion amplitude difference of each of the N image frames in the sliding window, the static variable
(Continued)

indicating a number of consecutive static image frames; and encoding the to-be-encoded image frame as an I frame based on the updated static variable not being less than a first preset threshold.

17 Claims, 7 Drawing Sheets

Related U.S. Application Data continuation of application No. PCT/CN2018/087539, filed on May 18, 2018.

(51) Int. Cl.
  *H04N 19/142* (2014.01)
  *H04N 19/172* (2014.01)
  *H04N 19/176* (2014.01)
  *H04N 19/59* (2014.01)
  *H04N 19/61* (2014.01)
  *H04N 7/14* (2006.01)
  *H04N 19/139* (2014.01)
  *H04N 19/573* (2014.01)

(52) U.S. Cl.
  CPC ......... *H04N 19/114* (2014.11); *H04N 19/142* (2014.11); *H04N 19/172* (2014.11); *H04N 19/176* (2014.11); *H04N 19/573* (2014.11); *H04N 19/59* (2014.11); *H04N 19/61* (2014.11)

(56) References Cited

U.S. PATENT DOCUMENTS

| | | | | |
|---|---|---|---|---|
| 2006/0126735 A1* | 6/2006 | Tanaka | ................. | H04N 19/114 375/240.12 |
| 2007/0160128 A1* | 7/2007 | Tian | ...................... | H04N 19/14 375/240 |
| 2009/0154816 A1* | 6/2009 | Swazey | .................. | H04N 19/87 382/232 |
| 2010/0061461 A1* | 3/2010 | Bankoski | ............. | H04N 19/105 375/240.16 |
| 2011/0002385 A1* | 1/2011 | Kobayashi | ............. | H04N 19/61 375/240.13 |
| 2011/0131622 A1 | 6/2011 | Wu et al. | | |
| 2013/0293676 A1 | 11/2013 | Sugio et al. | | |
| 2014/0254660 A1* | 9/2014 | La | ........................ | H04N 19/176 375/240.02 |

FOREIGN PATENT DOCUMENTS

| | | |
|---|---|---|
| CN | 103796019 A | 5/2014 |
| CN | 105761263 A | 7/2016 |
| CN | 105898313 A | 8/2016 |
| CN | 106231301 A | 12/2016 |
| CN | 106254873 A | 12/2016 |
| JP | 9-327023 A | 12/1997 |
| JP | 2016-96398 A | 5/2016 |

OTHER PUBLICATIONS

International Search Report for PCT/CN2018/087539 dated, Aug. 8, 2018 (PCT/ISA/210).
Communication dated Mar. 3, 2020 from the State Intellectual Property Office of the P.R.C. in Application No. 201710461367.7.
Office Action dated Oct. 12, 2020 from the Japanese Patent Office in Application No. 2019-543009.
Communication dated Apr. 5, 2021, from the Japanese Patent Office in Application No. 2019-543009.
Communication dated Aug. 13, 2021, from the Intellectual Property of India in application No. 201947021948.

* cited by examiner

VIDEO CODING METHOD, DEVICE, DEVICE AND STORAGE MEDIUM

CROSS-REFERENCE TO RELATED APPLICATIONS

This application is a continuation of U.S. patent application Ser. No. 16/401,671 filed May 2, 2019 in the U.S. Patent and Trademark Office, now U.S. Pat. No. 10,893,275 issued Jan. 12, 2021, which is a continuation of International Patent Application No. PCT/CN2018/087539 filed May 18, 2018, which claims priority from Chinese Patent Application No. 201710461367.7, filed with the National Intellectual Property Administration, PRC on Jun. 15, 2017, the contents of which are incorporated by reference in their entireties.

FIELD

Methods and apparatuses consistent with example embodiments relate to multimedia technologies, and in particular, to a video encoding method, apparatus, and device, and a storage medium.

BACKGROUND

As the Internet and multimedia technologies have rapidly developed, videos are increasingly popular, for example, when a plurality of users make video calls or when users watch videos online. In this regard, there has been an increased focus on video transmission methods. An image frame sequence of a video includes a plurality of image frames, and in a process of transmitting the video, an amount of data transmitted is very large if the image frames are directly transmitted. Therefore, encoding is needed before transmission to reduce an amount of data.

The H.264 standard is a video encoding standard. In the H.264 standard, an I frame is a frame obtained by completely encoding a current image frame, and a P frame is a frame obtained by performing encoding according to differential data between a current image frame and a previous image frame. The I frame completely retains data in the image frame, where encoding quality is high. However, the P frame only needs to be encoded according to the differential data, where encoding efficiency is high, but encoding quality is low. The encoded I frame and P frame may constitute a group of pictures (GOP), and a GOP begins with an I frame and ends with a P frame that is before a next I frame.

When there is a large difference between a current image frame and a previous image frame, such as during a scene change, if the current image frame is encoded as a P frame, encoding quality is degraded too much, and therefore, the current image frame may be encoded as an I frame. To determine whether to encode a frame as an I frame or a P frame, a residual between the current image frame and a previous image frame may be obtained. The residual may represent a difference between the current image frame and the previous image frame. The residual is then compared with a preset threshold, and when the residual is greater than the preset threshold value, it can be determined that scene switching occurs in a video, and the current image frame is encoded as an I frame.

However, the foregoing method may result in an excessive number of consecutively encoded P frames, resulting in degradation of encoding quality.

SUMMARY

One or more embodiments of this application provide a video encoding method, apparatus, and device, and a storage medium, capable of resolving a problem of encoding quality degradation.

According to an aspect of an embodiment, there is provided a method that is performed by at least one processor of a video encoding device. The method includes identifying, by the at least one processor, N image frames in a sliding window, from among an image frame sequence, the N image frames in the sliding window including N−1 encoded image frames and a to-be-encoded image frame located at an end of the sliding window; obtaining, by the at least one processor, a motion amplitude difference of each of the N image frames in the sliding window, the motion amplitude difference indicating a difference between a motion amplitude of a corresponding image frame and a previous motion amplitude of a previous image frame, and the motion amplitude of the corresponding image frame indicating a ratio between an inter-frame prediction cost and an intra-frame prediction cost of the corresponding image frame; updating, by the at least one processor, a static variable based on the motion amplitude difference of each of the N image frames in the sliding window to obtain an updated static variable, the static variable indicating a number of consecutive static image frames; and encoding, by the at least one processor, the to-be-encoded image frame as an I frame based on the updated static variable not being less than a first preset threshold.

According to other aspects of various embodiments, there is also provided apparatuses, devices, systems and non-transitory computer readable mediums consistent with the method above.

BRIEF DESCRIPTION OF THE DRAWINGS

The above and other aspects, features and advantages will become apparent from the following detailed description taken in conjunction with the accompanying drawings in which.

DETAILED DESCRIPTION

The related technology does not provide a solution for interposing an I frame in a static scene where excessive P frames are encoded when a video is in the static scene for a long time, resulting in severe degradation of encoding quality of the video. One or more embodiments provide a method for encoding an I frame when a static scene lasts for a long time, thereby improving encoding quality. In addition, one or more embodiments provide a solution of encoding an I frame during scene switching occurring in a video, thereby avoiding encoding excessive I frames while improving encoding quality.

One or more embodiments provide an implementation environment. The implementation environment includes a first device 101 and a second device 102. The first device 101 and the second device 102 are connected to each other through a network. When transmitting a video to the second device 102, the first device 101 needs to first encode the video, and send the encoded video to the second device 102. The second device 102 performs decoding to obtain the original video.

Figure 1:
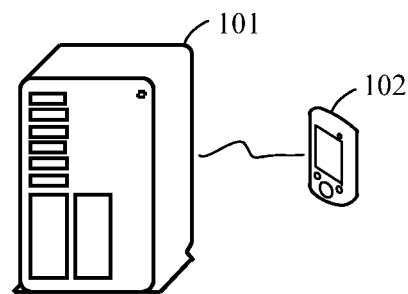
FIG. 1 is a schematic diagram of an implementation environment according to an embodiment.

One or more embodiments may be applied to a scenario of playing a video online. Referring to FIG. 1, a first device 101 is a video server configured to provide a video, and a second device 102 is a terminal configured to play the video. After obtaining an encoded video, the video server may transcode the video, during a transcoding process, encodes an I frame by using the encoding method provided in the embodiments, so as to obtain the encoded video, and sends the encoded video to the terminal. After decoding the encoded video, the terminal plays the video, so that a user can view the video on the terminal.

Figure 2:
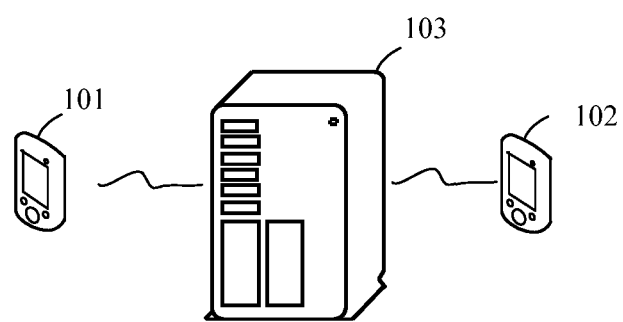
FIG. 2 is a schematic diagram of another implementation environment according to an embodiment.

One or more embodiments may be applied to a video call scenario. Referring to FIG. 2, a first device 101 and a second device 102 are two terminals making a video call. The first device 101 and the second device 102 are connected to each other through a server 103. In a processing of making the video call, each time the first device 101 obtains an image frame, after encoding the image frame, the first device 101 sends the image frame to the server 103, and the server 103 forwards the image frame to the second device 102. After performing decoding, the second device 102 plays the image frame. The first device 101 may obtain a plurality of image frames, and the second device 102 may consecutively play the plurality of image frames to play a video, so that a user can view the video on the second device 102.

Certainly, the embodiments may alternatively be applied to other video transmission scenarios, even if specific details are not provided herein.

Figure 3:
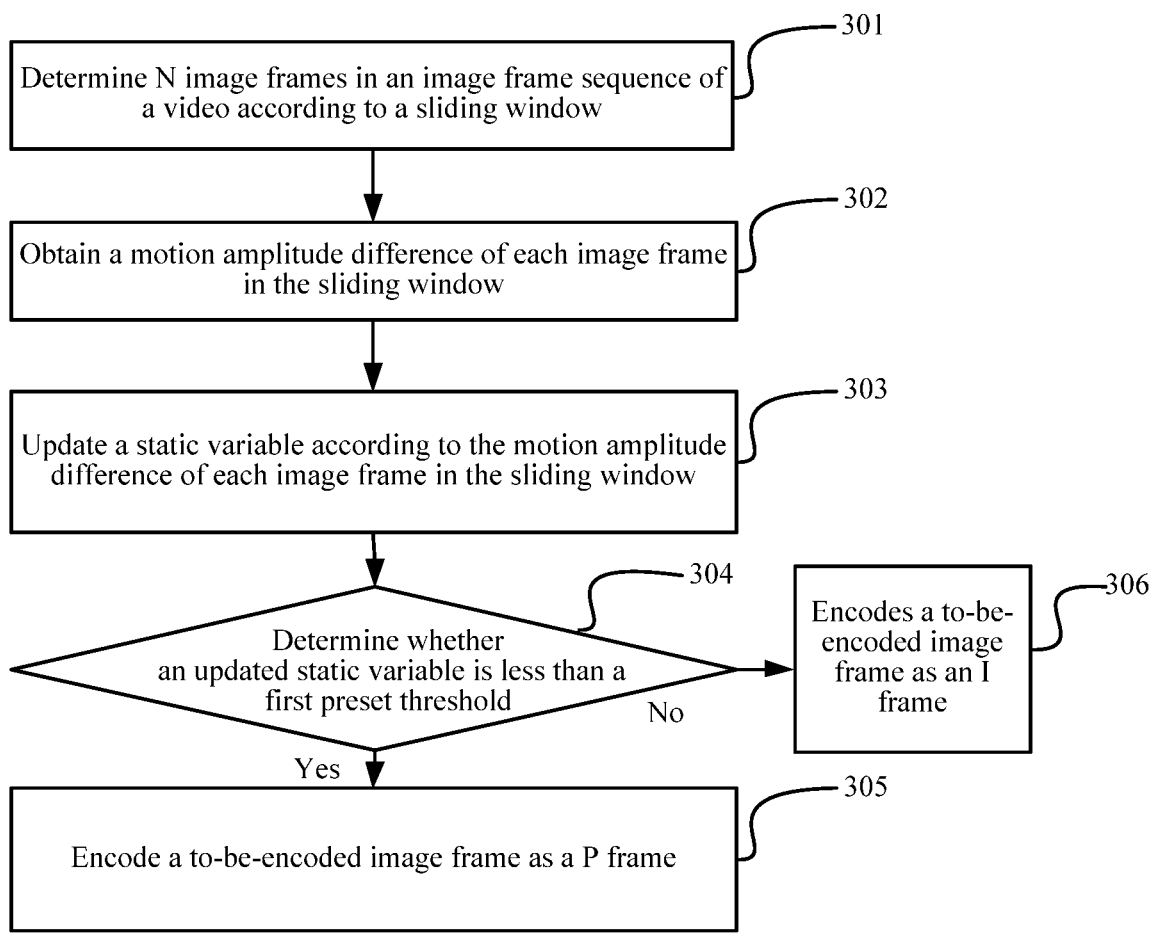
FIG. 3 is a flowchart of a video encoding method according to an embodiment.

FIG. 3 is a flowchart of a video encoding method according to an embodiment. This embodiment describes a process of encoding an image frame as an I frame in a static scene, where the process is executed by a video encoding device. The video encoding device may be a device having a video transmission function such as a terminal or a server. Referring to FIG. 3, the method includes the following:

301: The video encoding device determines N image frames in an image frame sequence of a video according to a sliding window.

A length of the sliding window is equal to N, where N is a positive integer greater than 1. N may be determined according to a frame rate of the video, and for example, may correspond to two-thirds of the frame rate.

In the process of encoding the image frame sequence of the video, N image frames may be determined by using the sliding window each time. The N image frames include N−1 encoded image frames and one to-be-encoded image frame located at a tail of the sliding window. In this case, the to-be-encoded image frame may be encoded according to the image frames in the sliding window.

Figure 4A:
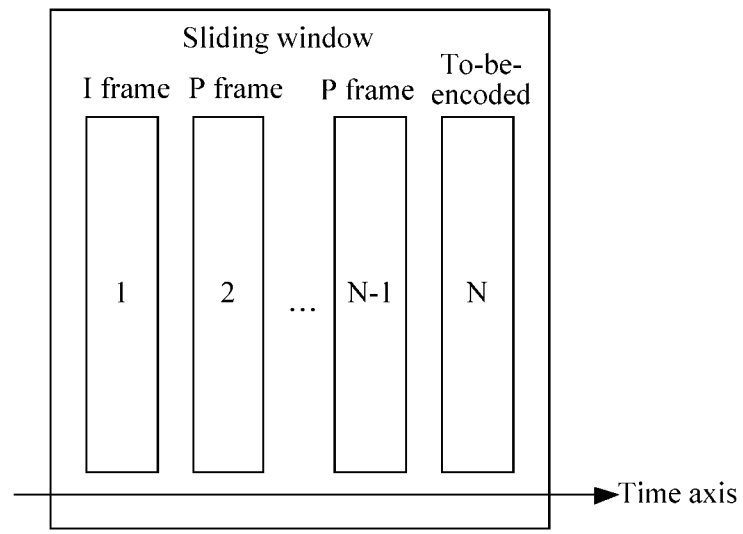
FIG. 4A is a schematic diagram of a sliding window and an image frame according to an embodiment.

For example, referring to FIG. 4A, when encoding of the video is started, the first image frame in the image frame sequence is encoded as an I frame, the second image frame to the $(N-1)^{th}$ image frame of the video are all encoded as P frames, the $N^{th}$ image frame is obtained, and encoding of the $N^{th}$ image frame in the sliding window is started.

It should be noted that in this embodiment, one to-be-encoded image frame is used as an example for description. The to-be-encoded image frame may be the $N^{th}$ image frame of the video, or any image frame after the $N^{th}$ image frame. For example, a step length by which the sliding window is moved each time is set to 1. To be specific, the sliding window is moved by one frame each time. Therefore, the $N^{th}$ image frame and each image frame after the $N^{th}$ image frame may all be encoded by using the encoding method provided in this embodiment. With regard to the image frames, other than the first image frame, before the $N^{th}$ image frame, because the image frames are close to the I frame and encoding quality would not be degraded too much when the image frames are encoded as P frames, it only needs to encode the image frames as P frames by default.

302. The video encoding device obtains a motion amplitude difference of each image frame in the sliding window.

A motion amplitude of the image frame is a ratio between inter-frame prediction cost and intra-frame prediction cost of the image frame, and can represent a variation amplitude between the image frame and a previous image frame. If the variation amplitude between the image frame and the previous image frame is larger, the motion amplitude is larger, and if the variation amplitude between the image frame and the previous image frame is smaller, the motion amplitude is smaller.

A motion amplitude difference of the image frame is a difference between the motion amplitude of the image frame and a motion amplitude of the previous image frame, and is used to represent a fluctuation between a variation amplitude of the image frame and a variation amplitude of the previous image frame. If the motion amplitude difference is larger, it represents the fluctuation between the variation amplitude of the image frame and the variation amplitude of the previous image frame is sharper, and if the motion amplitude difference is smaller, it represents that the fluctuation between the variation amplitude of the image frame and the variation amplitude of the previous image frame is smoother. A difference between the foregoing variation amplitudes may represent a difference between displayed screens of the two image frames. If the motion amplitude difference is large, it indicates that a screen difference is large, and if the motion amplitude difference is small, it indicates that a screen difference is small.

$I_{cost}$ represents intra-frame prediction cost, $P_{cost}$ represents inter-frame prediction cost, a motion amplitude of the $N^{th}$ image frame is $\alpha_n = P_{cost}/I_{cost}$, a motion amplitude difference of the $N^{th}$ image frame is $\eta_n = \alpha_n - \alpha_{n-1}$, and n represents a serial number of an image frame in an image frame sequence of a video.

With regard to intra-frame prediction cost $I_{cost}$ of an image frame, after down-sampling is performed on the image frame, the sampled image frame is divided into a plurality of macroblocks of a specified size, predicted blocks of each macroblock in a plurality of directions are calculated, and an SATD of a residual between the macroblock and the predicted block is calculated, to obtain optimal intra-frame prediction cost $I_{cost}$. A sample size during the down-sampling may be determined according to requirements. For example, a length of the sampled image frame may be a half of a length of the original image frame, and a width may be a half of a width of the original image frame. In addition, the specified size may also be determined according to a prediction requirement, and for example, may be 8*8. The SATD indicates performing Hadamard transformation on a residual and then performing absolute value summation.

With regard to inter-frame prediction cost $P_{cost}$ of an image frame, after down-sampling is performed on the image frame, the sampled image frame is divided into a plurality of macroblocks of a specified size. With regard to each macroblock, an optimal reference block of the macroblock is obtained by using integer pixel diamond prediction, and an SATD of a residual between the macroblock and the reference block is calculated, to obtain an optimal motion amplitude. A minimum of the motion amplitude and $I_{cost}$ of the macroblock is used as $P_{cost}$ of the macroblock, and a sum of $P_{cost}$ of the plurality of macroblocks is used as $P_{cost}$ of the image frame.

It should be noted that a motion amplitude difference of each image frame can be obtained through calculation before encoding. When a current image frame is encoded, a motion amplitude difference of the image frame can be calculated. In addition, because motion amplitude differences of image frames before the image frame have been calculated during encoding, it is unnecessary to re-calculate the motion amplitude differences of the image frames, and instead, the motion amplitude differences can be directly obtained. Such a direct obtaining manner greatly reduces an amount of calculation in an encoding process.

303. The video encoding device updates a static variable according to the motion amplitude difference of each image frame in the sliding window.

A static image frame means an image frame in a static scene. The static variable is used to indicate a quantity of determined consecutive static image frames, and is increased with the determined consecutive static image frames in an encoding process. The static variable gradually accumulates, and during an accumulation process, if any image frame is not a static image frame, the static variable is reset to 0, and accumulation is restarted.

In this embodiment, whether the to-be-encoded image frame is a static image frame may be determined according to the motion amplitude difference of each image frame in the sliding window, and an update is performed according to a determining result and the determined static variable, to obtain an updated static variable. In an implementation, the static image frame may be determined and the static variable may be updated through the following process:

When it is determined whether the to-be-encoded image frame is a static image frame, whether a first preset condition is met currently is determined. The first preset condition is that an absolute value of a motion amplitude difference of the to-be-encoded image frame is less than a second preset threshold and an absolute value of a sum of motion amplitude differences of all the image frames in the sliding window is less than a third preset threshold. Therefore, the video encoding device determines whether the absolute value of the motion amplitude difference of the to-be-encoded image frame is less than the second preset threshold and determines whether the absolute value of the sum of the motion amplitude differences of all the image frames in the sliding window is less than the third preset threshold, and if yes, determines that the first preset condition is met, and the to-be-encoded image frame is a static image frame, and increases the determined static variable by 1, to obtain the updated static variable. Otherwise, when it is determined that the first preset condition is not met, and the to-be-encoded image frame is not a static image frame, the updated static variable is set 0, and counting of a quantity of consecutive static image frames is restarted.

For example, the video encoding device may determine a static variable by using the following formula:

$$f_n = \begin{cases} f_{n-1} + 1, & |\eta_n| < \eta_T \text{ and } |\xi_n| < \xi_T \\ 0, & \text{other} \end{cases},$$

where $f_n$ represents a static variable determined according to a to-be-encoded image frame, $f_{n-1}$ represents a static variable determined according to a previous image frame of the to-be-encoded image frame, and $\eta_n$ represents a motion amplitude difference of the to-be-encoded image frame, where $\eta_n = \alpha_n - \alpha_{n-1}$, $\alpha_n$ represents a motion amplitude of the to-be-encoded image frame, and $\alpha_{n-1}$ represents the previous image frame of the to-be-encoded image frame, $\xi_n$ represents a sum of motion amplitude differences of all image frames in a sliding window, n is a positive integer greater than 1, $\eta_T$ represents a second preset threshold, and $\xi_T$ represents a third preset threshold. Values of a and b may be determined after encoding efficiency and encoding quality are comprehensively considered and be fine-tuned according to an actual image frame sequence, for example, $\eta_T$=0.2, and $\xi_T$=1.

304. The video encoding device determines whether an updated static variable is less than a first preset threshold, if yes, performs step 305, and if not, performs step 306.

In this embodiment, to avoid encoding excessive P frames in a static scene, a condition for encoding an I frame is that a quantity of consecutive static image frames reaches the first preset threshold, and under such a condition, the video is in a static scene for a long time, and sufficient P frames are encoded according to a sufficient quantity of static image frames. Because encoding quality would be degraded too much if encoding of the P frame is continued, it needs to encode an I frame.

Therefore, when obtaining an updated static variable, the video encoding device determines whether the updated static variable is less than the first preset threshold. If the updated static variable is less than the first preset threshold, indicating that the quantity of consecutive static image frames does not exceed an upper limit, out of the consideration of improving encoding efficiency, encoding of the P frame may be continued. If the updated static variable is not less than the first preset threshold, indicating that the quantity of consecutive static image frames is too large, out of the consideration of improving encoding quality, it needs to encode an I frame. The first preset threshold may be determined by comprehensively considering requirements on encoding quality and encoding efficiency. For example, the first preset threshold may be equal to N.

305. The video encoding device encodes the to-be-encoded image frame as a P frame.

To encode the P frame, differential data between the to-be-encoded image frame and the previous image frame is obtained, encoding is performed according to the differential data, and the obtained encoded image frame is a P frame.

306. The video encoding device encodes the to-be-encoded image frame as an I frame.

To encode the I frame, encoding is performed directly according to data in the to-be-encoded image frame, and the obtained encoded image frame is an I frame.

In another embodiment, in addition to the foregoing condition that the static variable is not less than the first preset threshold, the condition for encoding the I frame may further include a second preset condition. Correspondingly, the foregoing steps 304 to 306 may be replaced with the following steps: determining whether the updated static variable is less than a first preset threshold, and determining whether a second preset condition is met; when the updated static variable is not less than the first preset threshold, and the second preset condition is met, encoding the to-be-encoded image frame as an I frame; and when the updated static variable is less than the first preset threshold or the second preset condition is not met, encoding the to-be-encoded image frame as a P frame.

$0 < \alpha_n \leq \sigma_1$ and $\mu_{I,n} - \mu_{n-1} > T_{1,n}$;

$\sigma_1 < \alpha_n \leq \sigma_2$ and $\mu_{I,n} - \mu_{n-1} > T_{2,n}$;

$\sigma_2 < \alpha_n \leq \sigma_3$ and $\mu_{I,n} - \mu_{n-1} > T_{3,n}$; and $\sigma_3 < \alpha_n \leq \sigma_4$ and $\mu_{I,n} - \mu_{n-1} > T_{4,n}$, where n represents a serial number of the to-be-encoded image frame; $\alpha_n$ represents a motion amplitude of the to-be-encoded image frame; $\mu_{I,n}$ represents a peak signal-to-noise ratio (PSNR) of a luminance component of an I frame that is before the to-be-encoded image frame and that is closest to the to-be-encoded image frame; $\mu_{n-1}$ represents a PSNR of a luminance component of a previous image frame of the to-be-encoded image frame, where a PSNR of a luminance component may be used to assess encoding quality of a corresponding image frame; and $\sigma_1$, $\sigma_2$, $\sigma_3$, and $\sigma_4$, and $T_{1,n}$, $T_{2,n}$, $T_{3,n}$, and $T_{4,n}$ are positive thresholds, $\sigma_1$, $\sigma_2$, $\sigma_3$, and $\sigma_4$ represent thresholds of an image complexity variation, and may be set according to requirements: $\sigma_1 < \sigma_2$, $\sigma_2 < \sigma_3$, and $\sigma_3 < \sigma_4$, for example, may be set as follows: $\sigma_1 = 0.2$, $\sigma_2 = 0.3$, $\sigma_3 = 0.4$, and $\sigma_4 = 0.5$, and $T_{1,n} > T_{2,n}$, $T_{2,n} > T_{3,n}$, and $T_{3,n} > T_{4,n}$.

Use of the foregoing second preset condition can ensure that a screen representing an image frame is relatively stable when a motion amplitude of the image frame is relatively small. In this case, encoding a P frame does not cause too much degradation of encoding quality. Therefore, it is unnecessary to encode excessive I frames, and no I frame may be encoded until the PSNR is reduced greatly, so that not only encoding quality is ensured, but also encoding efficiency is improved as much as possible. However, when a motion amplitude of an image frame is relatively large, a screen representing the image frame changes sharply. In this case, to avoid too much degradation of encoding quality, a condition for encoding an I frame may be relaxed, and an I frame may be encoded when the PSNR is reduced by a relatively small amplitude.

In this embodiment, with regard to the four thresholds $T_1$, $T_2$, $T_3$, and $T_4$, thresholds used by different image frames may be equal or not equal. In a possible implementation, after encoding of the $n^{th}$ image frame is completed, $T_{1,n}$, $T_{2,n}$, $T_{3,n}$, and $T_{4,n}$ may be updated to obtain updated $T_{1,n+1}$, $T_{2,n+1}$, $T_{3,n+1}$, and $T_{4,n+1}$, and the $(n+1)^{th}$ image frame is determined by using the updated thresholds. The updating manner is as follows:

$T_{1,n+1} = (1-\omega_T) \times T_{1,n} + \omega_T \times (\mu_1 - \mu_{n-1}) \, 0 < \alpha_n \leq \sigma_1$;

$T_{2,n+1} = (1-\omega_T) \times T_{2,n} + \omega_T \times (\mu_1 - \mu_{n-1}) \, \sigma_1 < \alpha_n \leq \sigma_2$;

$T_{3,n+1} = (1-\omega_T) \times T_{3,n} + \omega_T \times (\mu_1 - \mu_{n-1}) \, \sigma_2 < \alpha_n \leq \sigma_3$; and $T_{4,n+1} = (1-\omega_T) \times T_{4,n} + \omega_T \times (\mu_1 - \mu_{n-1}) \, \sigma_3 < \alpha_n \leq \sigma_4$, where initial values of the foregoing thresholds, namely, $T_1$, $T_2$, $T_3$, and $T_4$, may be determined according to a requirement on a reduction amplitude of the PSNR when the second I frame is encoded after the first I frame, and for example, may be set as follows: $T_{1,1} = 5$, $T_{2,1} = 4.5$, $T_{3,1} = 3$, $T_{4,1} = 2.5$. $\omega_T$ is a positive threshold representing a weight occupied by a current PSNR difference in an updating process, and for example, may be set as follows: $\omega_T = 0.2$.

In this embodiment, after encoding of the to-be-encoded image frame is completed, a next to-be-encoded image frame may be obtained, and the sliding window is moved backward by a distance of one image frame, to locate the next to-be-encoded image frame at the tail of the sliding window. In this case, steps 301 to 306 may be performed repeatedly, to continuously encode the next to-be-encoded image frame, and so on.

Figure 4B:
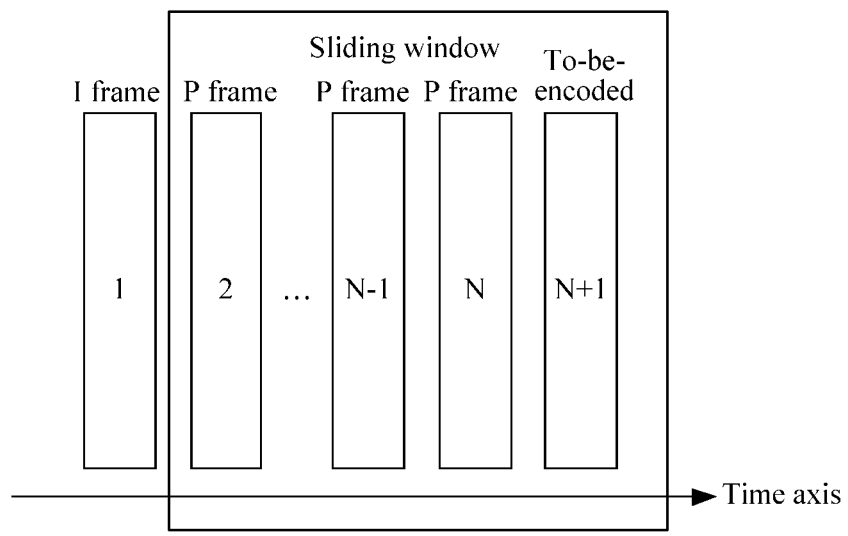
FIG. 4B is a schematic diagram of moving a sliding window according to an embodiment.

Based on an example shown in FIG. 4A, after encoding of the $N^{th}$ image frame is completed (it is assumed that the $N^{th}$ image frame is encoded as a P frame), the sliding window is moved backward by a distance of one image frame, to locate the $(N+1)^{th}$ image frame at the tail of the sliding window, as shown in FIG. 4B. In this case, encoding of the $(N+1)^{th}$ image frame is started.

It should be noted that the video encoding device may further set a preset maximum length of a GOP in a configuration file. The preset maximum length specifies a maximum length between two consecutive I frames. Therefore, when encoding the to-be-encoded image frame, the video encoding device not only determines whether to encode the image frame as an I frame by using the condition in the foregoing step 304, but also needs to obtain a distance between the to-be-encoded image frame and an I frame that is before the to-be-encoded image frame and that is closest to the to-be-encoded image frame, determine whether the distance reaches the preset maximum length, and when determining that the distance reaches the preset maximum length, encode the to-be-encoded image frame as an I frame even if the condition in step 304 is not met currently.

In the method provided in the embodiments, the N image frames are determined according to the sliding window, the static variable is updated according to the motion amplitude difference of each image frame in the sliding window, and when the updated static variable is not less than the first preset threshold, it is determined that the video is in a static scene for a long time, so that an I frame is encoded. This application provides a manner for determining whether a video is in a static scene for a long time, where an I frame is encoded when it is determined that the video is in a static scene for a long time, to avoid interposition of excessive P frames and improve encoding quality. In addition, when a P frame is encoded after an I frame is encoded, a quantity of bits occupied by the P frame is reduced, and a PSNR is increased, so that encoding efficiency is improved.

This application uses a ratio between inter-frame prediction cost and intra-frame prediction cost to represent a current motion amplitude, uses a PSNR of an encoded image frame to represent distortion, uses a sliding window to pre-analyze image frames in the sliding window, and with reference to a variation situation of a motion amplitude, utilizes a piecewise function to implement an algorithm of adaptively encoding an I frame, thereby improving encoding efficiency.

In addition, in a scenario of making a real-time video call, the preset maximum length of the GOP in the configuration file may be set to a relatively large value, to ensure that an I frame is not encoded frequently according to the preset maximum length, and instead, in more cases, whether an I frame is encoded is determined according to a situation of an image frame, thereby greatly improving encoding efficiency. In addition, compilation optimization is made in the algorithm used in this embodiment for processors of types such as armv7 and arm64, so that a processing speed can be improved.

Figure 5:
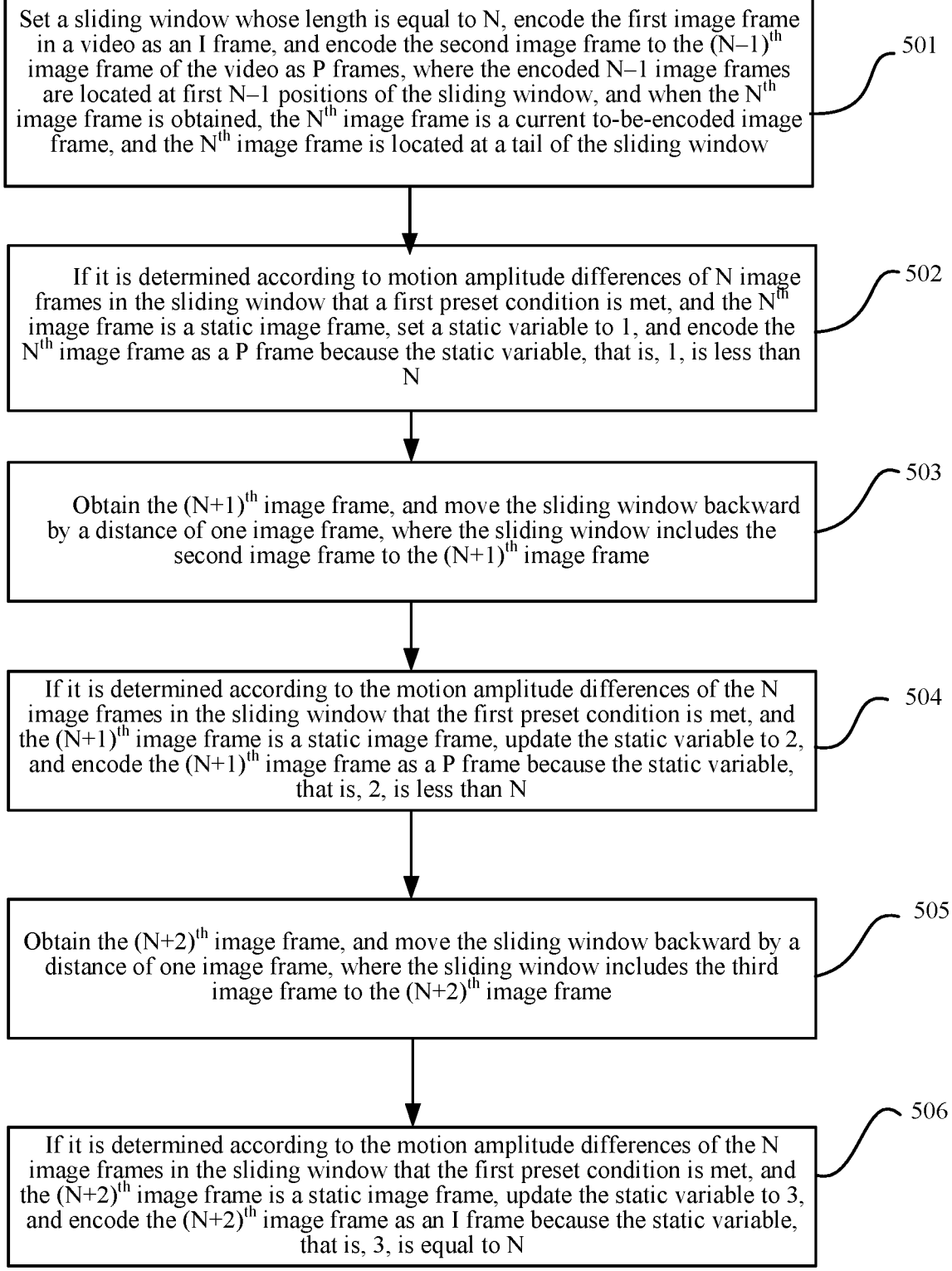
FIG. 5 is a flowchart of a video encoding method according to an embodiment.

FIG. 5 is a flowchart of a video encoding method according to an embodiment. In this embodiment, a process of encoding three image frames is used as an example, where the process is executed by a video encoding device. Referring to FIG. 5, the method includes the following:

501. Set a sliding window whose length is equal to N, encode the first image frame in a video as an I frame, and encode the second image frame to the $(N-1)^{th}$ image frame of the video as P frames, where the encoded N−1 image frames are located at first N−1 positions of the sliding window, and when the $N^{th}$ image frame is obtained, the $N^{th}$ image frame is a current to-be-encoded image frame, and the $N^{th}$ image frame is located at a tail of the sliding window.

In this embodiment, it is assumed that N is 3.

502. If it is determined according to motion amplitude differences of N image frames in the sliding window that a first preset condition is met, and the $N^{th}$ image frame is a static image frame, set a static variable to 1, and encode the $N^{th}$ image frame as a P frame because the static variable, that is, 1, is less than N.

503. Obtain the $(N+1)^{th}$ image frame, and move the sliding window backward by a distance of one image frame, where the sliding window includes the second image frame to the $(N+1)^{th}$ image frame.

504. If it is determined according to the motion amplitude differences of the N image frames in the sliding window that the first preset condition is met, and the $(N+1)^{th}$ image frame is a static image frame, update the static variable to 2, and encode the $(N+1)^{th}$ image frame as a P frame because the static variable, that is, 2, is less than N.

505. Obtain the $(N+2)^{th}$ image frame, and move the sliding window backward by a distance of one image frame, where the sliding window includes the third image frame to the $(N+2)^{th}$ image frame.

506. If it is determined according to the motion amplitude differences of the N image frames in the sliding window that the first preset condition is met, and the $(N+2)^{th}$ image frame is a static image frame, update the static variable to 3, and encode the $(N+2)^{th}$ image frame as an I frame because the static variable, that is, 3, is equal to N.

Figure 6:
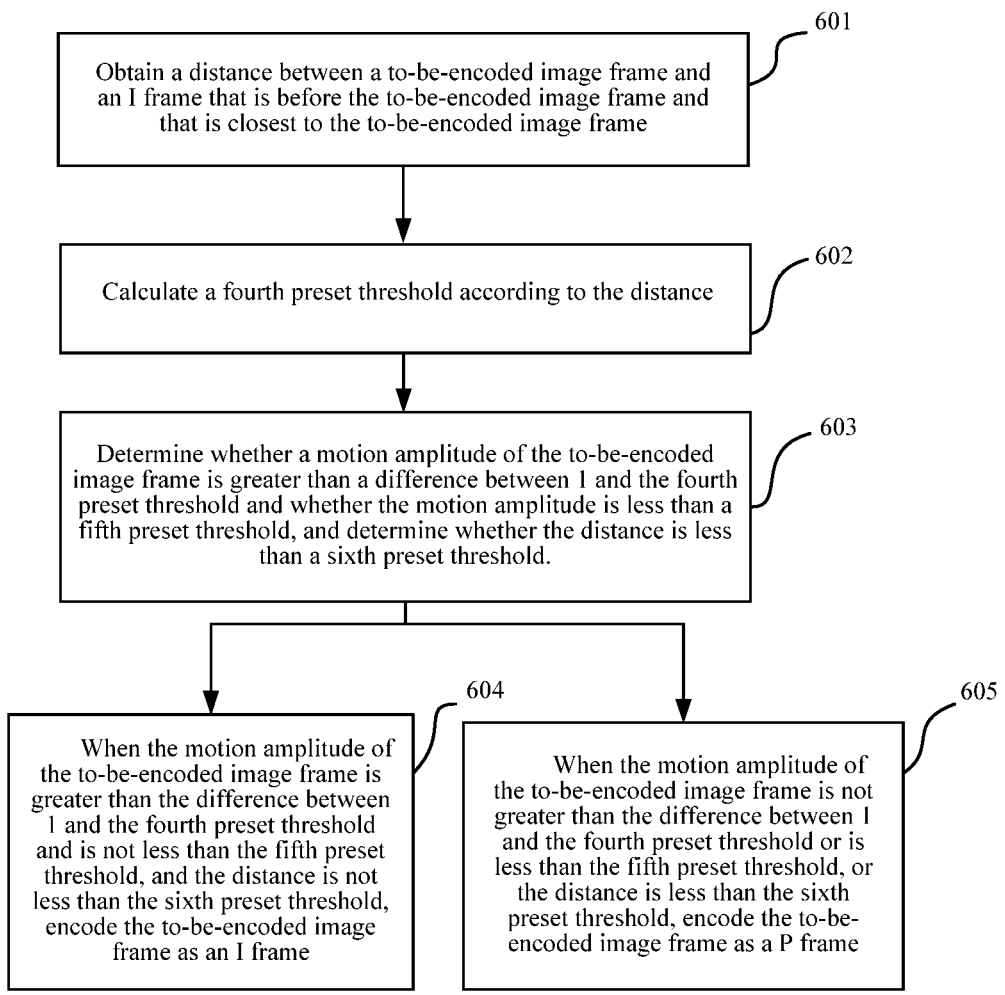
FIG. 6 is a flowchart of a video encoding method according to an embodiment.

FIG. 6 is a flowchart of a video encoding method according to an embodiment. This embodiment describes a process of encoding an I frame during scene switching, where the process is executed by a video encoding device. Referring to FIG. 6, the method includes the following:

601. Obtain a distance between a to-be-encoded image frame and an I frame that is before the to-be-encoded image frame and that is closest to the to-be-encoded image frame.

602. Calculate a fourth preset threshold according to the distance.

When the fourth preset threshold is calculated, the following formula is used:

$$T_{max} = \frac{V_{Scene}}{100};$$

$$T_{min} = \frac{T_{max}}{4}; \text{ and}$$

$$F_{bias} = \begin{cases} \frac{T_{min}}{4} D < \frac{GOP_{min}}{4} \\ T_{min} * \frac{D}{GOP_{min}} \quad \frac{GOP_{min}}{4} < D < GOP_{min} \\ T_{min} + \frac{(T_{max} - T_{min}) * (D - GOP_{min})}{GOP_{max} - GOP_{min}} D > GOP_{min} \end{cases},$$

where
$V_{scene}$ represents a specified threshold, and may be determined by the video encoding device in advance; D represents the distance; $GOP_{min}$ represents a preset minimum length of a group of pictures GOP; $GOP_{max}$ represents a preset maximum length of the GOP; and $F_{bias}$ represents the fourth preset threshold.

603. Determine whether a motion amplitude of the to-be-encoded image frame is greater than a difference between 1 and the fourth preset threshold and whether the motion amplitude is less than a fifth preset threshold, and determine whether the distance is less than a sixth preset threshold.

604: When the motion amplitude of the to-be-encoded image frame is greater than the difference between 1 and the fourth preset threshold and is not less than the fifth preset threshold, and the distance is not less than the sixth preset threshold, encode the to-be-encoded image frame as an I frame.

605: When the motion amplitude of the to-be-encoded image frame is not greater than the difference between 1 and the fourth preset threshold or is less than the fifth preset threshold, or the distance is less than the sixth preset threshold, encode the to-be-encoded image frame as a P frame.

In the related technology, an I frame is encoded when scene switching occurs in a video. However, if scene switching frequently occurs in the video, if excessive I frames are encoded, encoding P frames after the I frames may result in quality degradation. Therefore, to avoid encoding excessive I frames, a motion amplitude of an image frame to be encoded as an I frame should be greater than a difference between 1 and the fourth preset threshold and is not less than the fifth preset threshold, and the distance between the encoded I frame and the previous I frame cannot be less than the sixth preset threshold. The fifth preset threshold is used to determine a minimum motion amplitude of an image frame to be encoded as an I frame. The sixth preset threshold is used to determine a minimum distance between two consecutive I frames. The fifth preset threshold and the sixth preset threshold may be determined after encoding quality and encoding efficiency are comprehensively considered. For example, the fifth preset threshold may be 0.8, and the sixth preset threshold may be a half of a frame rate.

In an actual application, when determining is performed, the video encoding device may first determine whether the distance is less than the sixth preset threshold; if yes, directly encode the to-be-encoded image frame as a P frame; if not, further determine whether the motion amplitude of the to-be-encoded image frame is greater than the difference between 1 and the fourth preset threshold and whether the motion amplitude is less than the fifth preset threshold, and determine to encode the to-be-encoded image frame as an I frame or a P frame according to a determining result.

It should be noted that the embodiment shown in FIG. 3 may be combined with the embodiment shown in FIG. 6, and in an encoding process, the video encoding device may perform determining by using the foregoing steps 301 to 304 and using the foregoing steps 601 to 603, so as to determine to encode the to-be-encoded image frame as an I frame or a P frame.

In the method provided in this embodiment, it is ensured that the to-be-encoded image frame is encoded as an I frame when the motion amplitude of the to-be-encoded image frame is greater than the difference between 1 and the fourth preset threshold and is not less than the fifth preset threshold, and the distance between the to-be-encoded image frame and the previous I frame is not less than the sixth preset threshold, thereby avoiding encoding excessive I frames and improving encoding efficiency.

Figure 7:
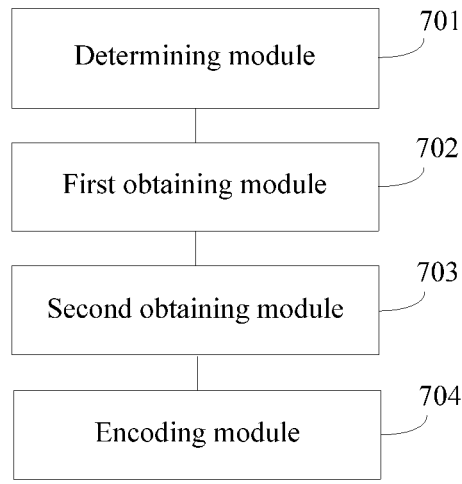
FIG. 7 is a schematic structural diagram of a video encoding apparatus according to an embodiment.

FIG. 7 is a schematic structural diagram of a video encoding apparatus according to an embodiment. Referring to FIG. 7, the apparatus includes the following:

a determining module 701, configured to perform the foregoing step 301;

a first obtaining module 702, configured to perform the foregoing step 302;

a second obtaining module 703, configured to perform the foregoing step 303; and an encoding module 704, configured to perform the foregoing step 305 or 306.

In a possible implementation, the second obtaining module 703 is configured to update a static variable.

In another possible implementation, the encoding module 704 is configured to encode an I frame when the updated static variable is not less than the specified quantity and a second preset condition is met.

The second preset condition includes at least one of the following conditions:

$$0<\alpha_n\leq\sigma_1 \text{ and } \mu_{I,n}-\mu_{n-1}>T_{1,n};$$

$$\sigma_1<\alpha_n\leq\sigma_2 \text{ and } \mu_{I,n}-\mu_{n-1}>T_{2,n};$$

$$\sigma_2<\alpha_n\leq\sigma_3 \text{ and } \mu_{I,n}-\mu_{n-1}>T_{3,n}; \text{ and}$$

$$\sigma_3<\alpha_n\leq\sigma_4 \text{ and } \mu_{I,n}-\mu_{n-1}>T_{4,n}.$$

In another possible implementation, $$T_{1,n+1}=(1-\omega_T)\times T_{1,n}+\omega_T\times(\mu_1-\mu_{n-1})\, 0<\alpha_n\leq\sigma_1;$$

$$T_{2,n+1}=(1-\omega_T)\times T_{2,n}+\omega_T\times(\mu_1-\mu_{n-1})\, \sigma_1<\alpha_n\leq\sigma_2;$$

$$T_{3,n+1}=(1-\omega_T)\times T_{3,n}+\omega_T\times(\mu_1-\mu_{n-1})\, \sigma_2<\alpha_n\leq\sigma_3; \text{ and}$$

$$T_{4,n+1}=(1-\omega_T)\times T_{4,n}+\omega_T\times(\mu_1-\mu_{n-1})\, \sigma_3<\alpha_n\leq\sigma_4, \text{ where}$$

$\omega_T$ is a positive threshold.

In another possible implementation, the encoding module 704 is further configured to encode the to-be-encoded image frame as a P frame when the updated static variable is less than a first preset threshold.

In another possible implementation, the apparatus further includes:

a switching module, configured to obtain a next to-be-encoded image frame and move the sliding window backward by a distance of one image frame, where the second obtaining module 703 is further configured to: continuously update the static variable according to the motion amplitude difference of each image frame in the sliding window until a current updated static variable is not less than the first preset threshold, where the encoding module 704 encodes a current to-be-encoded image frame as an I frame.

In another possible implementation, the apparatus further includes:

a third obtaining module, configured to perform the foregoing step 601;

a calculation module, configured to perform the foregoing step 602; and an encoding module 704, configured to perform the foregoing step 604 or 605.

All optional technical solutions above may be combined in any manner to form optional embodiments of the present disclosure. Details are not further described herein one by one.

It should be noted that, when the video encoding apparatus provided in the foregoing embodiment performs encoding, only divisions of the foregoing functional modules are described by using an example. During actual application, the foregoing functions may be allocated to and completed by different functional modules according to requirements, that is, the internal structure of the video encoding device is divided into different functional modules, to complete all or some of the foregoing described functions. In addition, the video encoding apparatus provided in the foregoing embodiment belongs to the same concept as the embodiment of the video encoding method. For a specific implementation process of the apparatus, refer to the method embodiment, and details are not described herein again.

Figure 8:
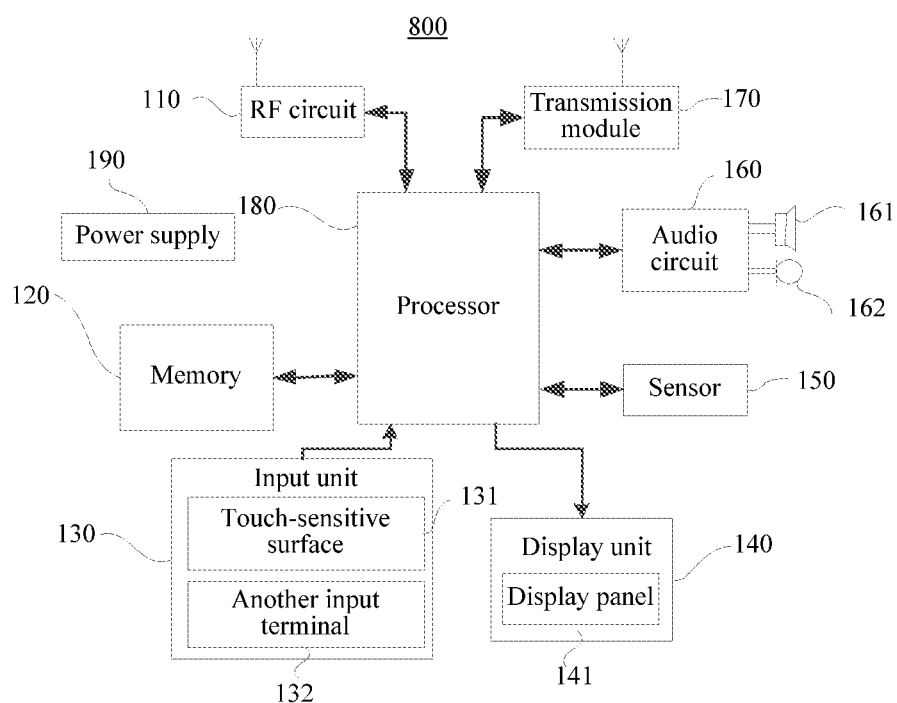
FIG. 8 is a schematic structural diagram of a terminal according to an embodiment.

FIG. 8 is a schematic structural diagram of a terminal according to an embodiment. The terminal may be configured to implement the functions performed by the video encoding device in the video encoding method illustrated in the foregoing embodiments. Specifically:

A terminal 800 may include components such as a radio frequency (RF) circuit 110, a memory 120 including one or more computer readable storage media, an input unit 130, a display unit 140, a sensor 150, an audio circuit 160, a transmission module 170, a processor 180 including one or more processing cores, and a power supply 190. A person skilled in the art may understand that the structure of the terminal shown in FIG. 8 does not constitute a limitation to the terminal, and the terminal may include more or fewer components than those shown in the figure, or some components may be combined, or a different component deployment may be used.

The RF circuit 110 may be configured to receive and send signals during an information receiving and sending process or a call process. Particularly, the RF circuit receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another terminal by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and a module, for example, a program instruction and a module corresponding to a terminal shown in the foregoing exemplary embodiments, and the processor 180 performs various functional applications and data processing by running the software program and the module stored in the memory 120, for example, implements video-based interaction. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 800, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to user setting and function control. Specifically, the input unit 130 may include a touch-sensitive surface 131 and another input terminal 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input terminal 132. Specifically, the another input terminal 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 800. The display unit 140 may include a display panel 141. Optionally, the display panel 141 may be configured in a form of a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 8, the touch-sensitive surface 131 and the display panel 141 are used as two separate parts to implement input and output functions, in some embodiments, the touch-sensitive surface 131 and the display panel 141 may be integrated to implement the input and output functions.

The terminal 800 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 800 is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal 800 is not described herein again.

The audio circuit 160, a loudspeaker 161, and a microphone 162 may provide audio interfaces between the user and the terminal 800. The audio circuit 160 may transmit, to the loudspeaker 161, an electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 800.

The terminal 800 may help, by using the transmission module 170, a user to receive and send an email, browse a webpage, and access stream media, and the like, which provides wireless or wired broadband Internet access for the user. Although FIG. 8 shows the transmission module 170, it may be understood that the transmission module 170 is not a necessary component of the terminal 800, and when required, the transmission module 170 may be omitted as long as the scope of the essence of the present disclosure is not changed.

The processor 180 is a control center of the terminal 800, is connected to various parts of the terminal 800 by using various interfaces and lines, and by running or executing a software program and/or module stored in the memory 120 and invoking data stored in the memory 120, performs various functions of the terminal 800 and process data, so as to perform overall monitoring on the mobile phone. Optionally, the processor 180 may include one or more processor cores. Preferably, the processor 180 may integrate an application processor and a modem. The application processor mainly processes an operating system, a user interface, an application program, and the like. The modem mainly processes wireless communication. It may be understood that the foregoing modem may alternatively not be integrated into the processor 180.

The terminal 800 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 800 may further include a camera, a Bluetooth module, and the like, which are not further described herein. Specifically, in this embodiment, the display unit of the terminal 800 is a touchscreen display. The terminal 800 further includes a memory and at least one instruction, where the at least one instruction is stored in the memory and is configured to be loaded and executed by one or more processors, to implement the video encoding method in the foregoing embodiments.

Figure 9:
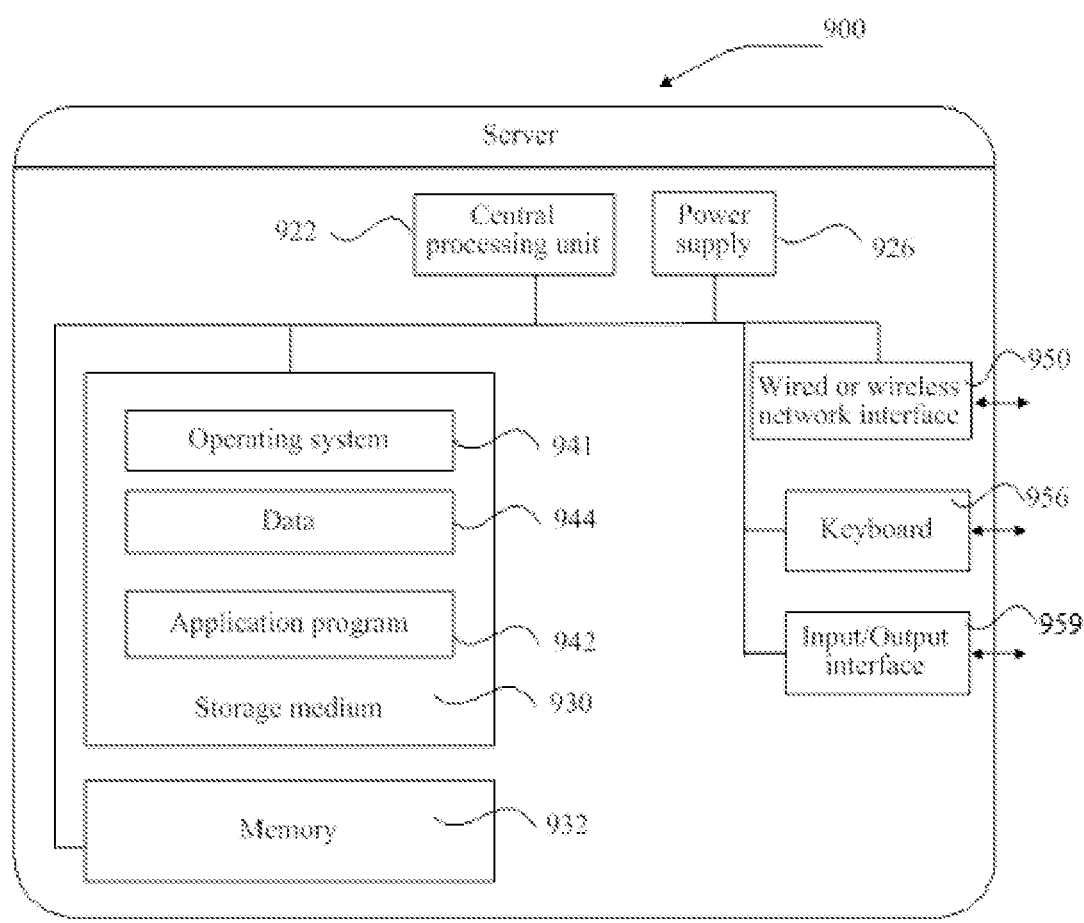
FIG. 9 is a schematic structural diagram of a server according to an embodiment.

FIG. 9 is a schematic structural diagram of a server according to an embodiment. The server 900 may vary greatly due to different configurations or performance, and may include one or more central processing units (CPU) 922 (for example, one or more processors) and a memory 932, and one or more storage media 930 (for example, one or more mass storage devices) that store an application program 942 or data 944. The memory 932 and the storage medium 930 may be transient or persistent storages. The program stored in the storage medium 930 may include one or more modules (not shown), and each module may include a series of instructions for the server. Still further, the CPU 922 may be configured to communicate with the storage medium 930, and load and execute, on the server 900, a series of instructions in the storage medium 930, to implement the video encoding method in the foregoing embodiments.

The server 900 may further include one or more power supplies 926, one or more wired or wireless network interfaces 950, one or more input/output interfaces 959, one or more keyboards 956, and/or one or more operating systems 941, for example, Windows Server™, Mac OS Unix Linux™, or FreeBSD™.

The server 900 may be configured to perform the steps performed by the video encoding device in the video encoding method provided in the foregoing embodiments.

The embodiments further provide a computer-readable storage medium. The computer-readable storage medium stores at least one instruction, the instruction being loaded and executed by a processor to perform operations performed in the video encoding method according to the foregoing embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely embodiments of the present disclosure, and are not intended to limit this application. Any modification, equivalent replacement, or improvement made within the spirit and principle shall fall within the scope of the present disclosure.

What is claimed is:

1. A method, performed by at least one processor, the method comprising:
    identifying, by the at least one processor, N image frames in a sliding window, from among an image frame sequence, the N image frames in the sliding window comprising a to-be-encoded image frame;
    obtaining, by the at least one processor, a motion amplitude difference of each of the N image frames in the sliding window, the motion amplitude difference indicating a difference between a motion amplitude of a corresponding image frame and a previous motion amplitude of a previous image frame;
    updating, by the at least one processor, a static variable based on the motion amplitude difference of each of the N image frames in the sliding window to obtain an updated static variable, the static variable indicating a number of consecutive static image frames; and
    encoding, by the at least one processor, the to-be-encoded image frame as an I frame based on the updated static variable not being less than a first preset threshold,
    wherein the updating the static variable based on the motion amplitude difference of each of the N image frames in the sliding window comprises:
        based on the to-be-encoded image frame being identified as a static image frame, increasing the static variable by 1, to obtain the updated static variable; and
        based on the to-be-encoded image frame being identified as a non-static image frame, setting the updated static variable to 0,
    wherein the motion amplitude of the corresponding image frame indicates a ratio between inter-frame prediction cost and intra-frame prediction cost of the corresponding image frame,
    wherein the to-be-encoded image frame is identified as the static image frame based on the motion amplitude of each of the N image frames in the sliding window meeting a first preset condition,
    wherein the to-be-encoded image frame is identified as the non-static image frame based on the first preset condition not being met, and
    wherein the first preset condition is that an absolute value of the motion amplitude difference of the to-be-encoded image frame is less than a second preset threshold and an absolute value of a sum of the motion amplitude difference of each of the N image frames in the sliding window is less than a third preset threshold.

2. The method according to claim 1, further comprising:
    after encoding of the to-be-encoded image frame is completed, obtaining, by the at least one processor, a next to-be-encoded image frame, and moving, by the at least one processor, the sliding window backward by one image frame to locate the next to-be-encoded image frame at an end of the sliding window; and
    continuously updating, by the at least one processor, the static variable according to the motion amplitude difference of each of the N image frames in the sliding window until a current updated static variable is not less than the first preset threshold, and then, encoding, by the at least one processor, a current to-be-encoded image frame as an I frame.

3. The method according to claim 1, wherein the encoding the to-be-encoded image frame as an I frame based on the updated static variable not being less than the first preset threshold comprises:
    encoding, by the at least one processor, the to-be-encoded image frame as an I frame based on the updated static variable not being less than the first preset threshold and meeting a second preset condition,
    wherein the second preset condition comprises at least one from among:

$0 < \alpha_n \le \sigma_1$ and $\mu_{I,n} - \mu_{n-1} > T_{1,n}$;

$\sigma_1 < \alpha_n \le \sigma_2$ and $\mu_{I,n} - \mu_{n-1} > T_{2,n}$;

$\sigma_2 < \alpha_n \le \sigma_3$ and $\mu_{I,n} - \mu_{n-1} > T_{3,n}$; and $\sigma_3 < \alpha_n \le \sigma_4$ and $\mu_{I,n} - \mu_{n-1} > T_{4,n}$, wherein n represents a serial number of the to-be-encoded image frame; $\alpha_n$ represents a motion amplitude of the to-be-encoded image frame; $\mu_{I,n}$ represents a peak signal-to-noise ratio PSNR of a luminance component of an I frame that is before the to-be-encoded image frame and that is closest to the to-be-encoded image frame; $\mu_{n-1}$ represents a PSNR of a luminance component of a previous image frame of the to-be-encoded image frame; and $\sigma_1$, $\sigma_2$, $\sigma_3$, and $\sigma_4$, and $T_{1,n}$, $T_{2,n}$, $T_{3,n}$, and $T_{4,n}$ are positive thresholds, wherein $\sigma_1 < \sigma_2$, $\sigma_2 < \sigma_3$, wherein $\sigma_3 < \sigma_4$, $T_{1,n} > T_{2,n}$, wherein $T_{2,n} > T_{3,n}$, and wherein $T_{3,n} > T_{4,n}$.

4. The method according to claim 3, further comprising:

after encoding of the to-be-encoded image frame is completed, obtaining, by the at least one processor, a next to-be-encoded image frame, and moving, by the at least one processor, the sliding window backward by one image frame to locate the next to-be-encoded image frame at an end of the sliding window; and continuously updating, by the at least one processor, the static variable according to the motion amplitude difference of each of the N image frames in the sliding window until a current updated static variable is not less than the first preset threshold, and then, encoding, by the at least one processor, a current to-be-encoded image frame as an I frame.

5. The method according to claim 1, wherein the method further comprises, after the updating the static variable based on the motion amplitude difference of each of the N image frames in the sliding window:

encoding, by the at least one processor, the to-be-encoded image frame as a P frame based on the updated static variable being less than the first preset threshold.

6. The method according to claim 5, further comprising:

after encoding of the to-be-encoded image frame is completed, obtaining, by the at least one processor, a next to-be-encoded image frame, and moving, by the at least one processor, the sliding window backward by one image frame to locate the next to-be-encoded image frame at an end of the sliding window; and continuously updating, by the at least one processor, the static variable according to the motion amplitude difference of each of the N image frames in the sliding window until a current updated static variable is not less than the first preset threshold, and then, encoding, by the at least one processor, a current to-be-encoded image frame as an I frame.

7. The method according to claim 1, further comprising:

after encoding of the to-be-encoded image frame is completed, obtaining, by the at least one processor, a next to-be-encoded image frame, and moving, by the at least one processor, the sliding window backward by one image frame to locate the next to-be-encoded image frame at an end of the sliding window; and continuously updating, by the at least one processor, the static variable according to the motion amplitude difference of each of the N image frames in the sliding window until a current updated static variable is not less than the first preset threshold, and then, encoding, by the at least one processor, a current to-be-encoded image frame as an I frame.

8. The method according to claim 1, wherein the method further comprises:

obtaining, by the at least one processor, a distance between the to-be-encoded image frame and an I frame that is before the to-be-encoded image frame and that is closest to the to-be-encoded image frame;

identifying, by the at least one processor, a fourth preset threshold according to the distance based on:

$$T_{max} = \frac{V_{Scene}}{100};$$

$$T_{min} = \frac{T_{max}}{4}; \text{ and}$$

$$F_{bias} = \begin{cases} \frac{T_{min}}{4} D < \frac{GOP_{min}}{4} \\ T_{min} * \frac{D}{GOP_{min}} \quad \frac{GOP_{min}}{4} < D < GOP_{min} \\ T_{min} + \frac{(T_{max} - T_{min})*(D - GOP_{min})}{GOP_{max} - GOP_{min}} D > GOP_{min} \end{cases},$$

wherein $V_{scene}$ represents a specified threshold; D represents the distance; $GOP_{min}$ represents a preset minimum length of a group of pictures GOP; $GOP_{max}$ represents a preset maximum length of the GOP; and $F_{bias}$ represents the fourth preset threshold; and wherein the method further comprises, based on a motion amplitude of the to-be-encoded image frame being greater than a difference between 1 and the fourth preset threshold, the motion amplitude of the to-be-encoded image frame not being less than a fifth preset threshold, and the distance not being less than a sixth preset threshold, encoding, by the at least one processor, the to-be-encoded image frame as an I frame.

9. An apparatus comprising:

at least one memory configured to store computer program code; and at least one processor configured to access the at least one memory and operate as instructed by the computer program code, the computer program code including:

identifying code configured to cause the at least one processor to identify N image frames in a sliding window, from among an image frame sequence, the N image frames in the sliding window comprising a to-be-encoded image frame;

first obtaining code configured to cause the at least one processor to obtain a motion amplitude difference of each of the N image frames in the sliding window, the motion amplitude difference indicating a difference between a motion amplitude of a corresponding image frame and a previous motion amplitude of a previous image frame;

second obtaining code configured to cause the at least one processor to update a static variable based on the motion amplitude difference of each of the N image frames in the sliding window to obtain an updated static variable, the static variable indicating a number of consecutive static image frames; and encoding code configured to cause the at least one processor to encode the to-be-encoded image frame as an I frame based on the updated static variable not being less than a first preset threshold, wherein the second obtaining code is further configured to cause the at least one processor to:

increase, based on the to-be-encoded image frame being identified as a static image frame, the static variable by 1, to obtain the updated static variable; and set, based on the to-be-encoded image frame being identified as a non-static image frame, the updated static variable to 0, wherein the motion amplitude of the corresponding image frame indicates a ratio between inter-frame prediction cost and intra-frame prediction cost of the corresponding image frame, wherein the second obtaining code is further configured to cause the at least one processor to:
   identify the to-be-encoded image frame as the static image frame based on the motion amplitude of each of the N image frames in the sliding window meeting a first preset condition; and
   identify the to-be-encoded image frame as the non-static image frame based on the first preset condition not being met, and wherein the first preset condition is that an absolute value of the motion amplitude difference of the to-be-encoded image frame is less than a second preset threshold and an absolute value of a sum of the motion amplitude difference of each of the N image frames in the sliding window is less than a third preset threshold.

10. The apparatus according to claim 9, wherein the encoding code is further configured to cause the at least one processor to encode the to-be-encoded image frame as an I frame based on the updated static variable not being less than the first preset threshold and meeting a second preset condition, wherein the second preset condition comprises at least one from among:

$0 < \alpha_n \leq \sigma_1$ and $\mu_{I,n} - \mu_{n-1} > T_{1,n}$;

$\sigma_1 < \alpha_n \leq \sigma_2$ and $\mu_{I,n} - \mu_{n-1} > T_{2,n}$;

$\sigma_2 < \alpha_n \leq \sigma_3$ and $\mu_{I,n} - \mu_{n-1} > T_{3,n}$; and $\sigma_3 < \alpha_n \leq \sigma_4$ and $\mu_{I,n} - \mu_{n-1} > T_{4,n}$, wherein n represents a serial number of the to-be-encoded image frame; $\alpha_n$ represents a motion amplitude of the to-be-encoded image frame; $\mu_{I,n}$ represents a peak signal-to-noise ratio PSNR of a luminance component of an I frame that is before the to-be-encoded image frame and that is closest to the to-be-encoded image frame; $\mu_{n-1}$ represents a PSNR of a luminance component of a previous image frame of the to-be-encoded image frame; and $\sigma_1$, $\sigma_2$, $\sigma_3$, and $\sigma_4$, and $T_{1,n}$, $T_{2,n}$, $T_{3,n}$, and $T_{4,n}$ are positive thresholds,
wherein $\sigma_1 < \sigma_2$, $\sigma_2 < \sigma_3$,
wherein $\sigma_3 < \sigma_4$, $T_{1,n} > T_{2,n}$,
wherein $T_{2,n} > T_{3,n}$, and
wherein $T_{3,n} > T_{4,n}$.

11. The apparatus according to claim 9, wherein the encoding code further causes the one or more processors to encode the to-be-encoded image frame as a P frame based on the updated static variable being less than the first preset threshold.

12. The apparatus according to claim 9, wherein the computer program code further comprises switching code configured to cause the at least one processor to: after encoding of the to-be-encoded image frame is completed, obtain a next to-be-encoded image frame, and move the sliding window backward by one image frame to locate the next to-be-encoded image frame at an end of the sliding window, and
   wherein the second obtaining code is further configured to cause the at least one processor to: continuously update the static variable according to the motion amplitude difference of each of the N image frames in the sliding window until a current updated static variable is not less than the first preset threshold, wherein the encoding code further causes the one or more processors to encode a current to-be-encoded image frame as an I frame.

13. One or more non-transitory storage media storing computer readable instructions, the computer readable instructions, when executed by one or more processors, cause the one or more processors to:
   identify N image frames in a sliding window, from among an image frame sequence, the N image frames in the sliding window comprising a to-be-encoded image frame;
   obtain a motion amplitude difference of each of the N image frames in the sliding window, the motion amplitude difference indicating a difference between a motion amplitude of a corresponding image frame and a previous motion amplitude of a previous image frame;
   update a static variable, to obtain an updated static variable, according to the motion amplitude difference of each image frame in the sliding window, the static variable indicating a number of consecutive static image frames; and
   encoding the to-be-encoded image frame as an I frame based on the updated static variable not being less than a first preset threshold,
   wherein the update of the static variable comprises:
      based on the to-be-encoded image frame being identified as a static image frame, increasing the static variable by 1, to obtain the updated static variable; and
      based on the to-be-encoded image frame being identified as a non-static image frame, setting the updated static variable to 0,
   wherein the motion amplitude of the corresponding image frame indicates a ratio between inter-frame prediction cost and intra-frame prediction cost of the corresponding image frame,
   wherein the to-be-encoded image frame is identified as the static image frame based on motion amplitudes of each of the N image frames in the sliding window meeting a first preset condition,
   wherein the to-be-encoded image frame is identified as the non-static image frame based on the first preset condition not being met, and
   wherein the first preset condition is that an absolute value of the motion amplitude difference of the to-be-encoded image frame is less than a second preset threshold and an absolute value of a sum of the motion amplitude difference of each of the N image frames in the sliding window is less than a third preset threshold.

14. The one or more non-transitory storage media according to claim 13, wherein the computer readable instructions further cause the one or more processors to:
   encode the to-be-encoded image frame as an I frame based on the updated static variable not being less than the first preset threshold and meeting a second preset condition,
   wherein the second preset condition comprises at least one from among:

$0 < \alpha_n \leq \sigma_1$ and $\mu_{I,n} - \mu_{n-1} > T_{1,n}$;

$\sigma_1 < \alpha_n \leq \sigma_2$ and $\mu_{I,n} - \mu_{n-1} > T_{2,n}$;

$\sigma_2 < \alpha_n \leq \sigma_3$ and $\mu_{I,n} - \mu_{n-1} > T_{3,n}$; and $\sigma_3 < \alpha_n \leq \sigma_4$ and $\mu_{I,n} - \mu_{n-1} > T_{4,n}$, wherein n represents a serial number of the to-be-encoded image frame; $\alpha_n$ represents a motion amplitude of the to-be-encoded image frame; $\mu_{I,n}$ represents a peak signal-to-noise ratio PSNR of a luminance component of an I frame that is before the to-be-encoded image frame and that is closest to the to-be-encoded image frame; $\mu_{n-1}$ represents a PSNR of a luminance component of a previous image frame of the to-be-encoded image frame; and $\sigma_1$, $\sigma_2$, $\sigma_3$, and $\sigma_4$, and $T_{1,n}$, $T_{2,n}$, $T_{3,n}$, and $T_{4,n}$ are positive thresholds, wherein $\sigma_1 < \sigma_2$, $\sigma_2 < \sigma_3$, and wherein $\sigma_3 < \sigma_4$, wherein $T_{2,n} > T_{3,n}$, and wherein $T_{3,n} > T_{4,n}$.

15. The one or more non-transitory storage media according to claim 13, wherein the computer readable instructions further cause the one or more processors to:

encode the to-be-encoded image frame as a P frame based on the updated static variable being less than the first preset threshold.

16. The one or more non-transitory storage media according to claim 10, wherein the computer readable instructions further cause the one or more processors to:

after encoding of the to-be-encoded image frame is completed, obtain a next to-be-encoded image frame, and move the sliding window backward one image frame to locate the next to-be-encoded image frame at an end of the sliding window; and continuously update the static variable according to the motion amplitude difference of each of the N image frames in the sliding window until a current updated static variable is not less than the first preset threshold, and then, encode a current to-be-encoded image frame as an I frame.

17. The one or more non-transitory storage media according to claim 13, wherein the computer readable instructions further cause the one or more processors to:

obtain a distance between the to-be-encoded image frame and an I frame that is before the to-be-encoded image frame and that is closest to the to-be-encoded image frame;

identify a fourth preset threshold according to the distance based on:

$$T_{max} = \frac{V_{Scene}}{100};$$

$$T_{min} = \frac{T_{max}}{4}; \text{ and}$$

$$F_{bias} = \begin{cases} \frac{T_{min}}{4} D < \frac{GOP_{min}}{4} \\ T_{min} * \frac{D}{GOP_{min}} \quad \frac{GOP_{min}}{4} < D < GOP_{min} \\ T_{min} + \frac{(T_{max} - T_{min}) * (D - GOP_{min})}{GOP_{max} - GOP_{min}} D > GOP_{min} \end{cases},$$

wherein $V_{scene}$ represents a specified threshold; D represents the distance; $GOP_{min}$ represents a preset minimum length of a group of pictures GOP; $GOP_{max}$ represents a preset maximum length of the GOP; and $F_{bias}$ represents the fourth preset threshold; and wherein the computer readable instructions further cause the one or more processors to, based on a motion amplitude of the to-be-encoded image frame being greater than a difference between 1 and the fourth preset threshold, the motion amplitude of the to-be-encoded image frame not being less than a fifth preset threshold, and the distance not being less than a sixth preset threshold, encode the to-be-encoded image frame as an I frame.

* * * * *